United States Patent [19]

Böttcher et al.

[11] Patent Number: 4,597,980
[45] Date of Patent: Jul. 1, 1986

[54] PROCEDURE FOR THE PRODUCTION OF FOOD FOAMS

[75] Inventors: Regina Böttcher, Berlin; Hubert Juhnke, Potsdam-Babelsberg; Gabriele Kulawick, Potsdam; Günter Zehle, Bergholz-Rehbrücke; Helmut Zösche, Potsdam, all of German Democratic Rep.

[73] Assignee: Institut fuer Getreideverarbeitung im VEB Kombinat Nahrungsmittel und Kaffee, Bergholz-Rehbruecke, German Democratic Rep.

[21] Appl. No.: 612,190

[22] Filed: May 21, 1984

[51] Int. Cl.$^4$ .............................................. A23J 3/02
[52] U.S. Cl. .................................. 426/568; 426/474; 426/572
[58] Field of Search ........ 426/568, 564, 474, 571–572; 261/DIG. 16, DIG. 26, 93

[56] References Cited

U.S. PATENT DOCUMENTS

| 1,889,236 | 11/1932 | Burmeister | 426/474 |
| 2,600,569 | 6/1952 | Oakes | 426/474 |
| 3,326,691 | 6/1967 | Moore | 426/568 X |
| 3,378,376 | 4/1968 | Sebring | 426/568 |
| 3,556,813 | 1/1971 | Creswick | 426/568 X |
| 3,606,266 | 9/1971 | MacManus | 261/DIG. 16 |
| 3,700,214 | 10/1972 | MacManus | 261/DIG. 16 |
| 3,713,841 | 1/1973 | MacManus | 426/474 |
| 3,846,515 | 11/1974 | Williamson | 261/DIG. 26 |
| 4,144,293 | 3/1979 | Hamoto et al. | 261/DIG. 16 |
| 4,251,561 | 2/1981 | Gajewski | 426/568 |
| 4,420,495 | 12/1983 | Hammer et al. | 426/564 |
| 4,457,876 | 7/1984 | Brand | 261/DIG. 16 |

Primary Examiner—R. B. Penland
Attorney, Agent, or Firm—Jordan and Hamburg

[57] ABSTRACT

A procedure for the production preferably of food foams from flowable and pumpable mediums, as e.g. egg/white solutions, whole egg/sugar mixtures or cream products. It is applicable in the baking and confectionery industry, to the production of physically aerated baked and confectionery goods, as well as foamed confections. The main object of the invention is to produce well aerated foams of high volume with a minimum of apparatus and energy input. The invention therefore is based upon the aim of providing conditions and to introduce the gas in such a volume ratio into the medium to be foamed, that volumes of at least 900 p.c. are obtained. According to the invention, the medium to be foamed and gas are delivered separately to a pump, in a volume ratio of at least 1:8, mixed, and then the mixture (medium/gas) is delivered from the pump to a dispersion tube where it is foamed.

6 Claims, 1 Drawing Figure

PROCEDURE FOR THE PRODUCTION OF FOOD FOAMS

BACKGROUND OF THE INVENTION AND PRIOR ART STATEMENT

The invention relates to a procedure for the production preferably of food foams from flowable and pumpable mediums, as for instance sugar/whole eggs mixtures, egg white solutions or cream products which may be used for baked goods, biscuits and confections. The procedure is applicable in discontinuous units; it is, however, especially suitable for the use in continuous lines in the baking and confectionery industry, for instance for the production of physically aerated baked and confectionery goods as well as foamed formed confections.

The procedures for the production of food foams may be classified as follows, discontinuous procedures continuous procedures, with gas being blown under pressure into the medium continuous procedures with gas being aspirated according to the principle of the water jet pump or the injector by changing the speed of the medium to be foamed.

In the discontinuous procedures for foam production, the well-known beating and mixing machines of different technical design are used. According to these procedures and with these machines, a volume increase up to 500 p.c. is obtained, e.g. in whole eggs/sugar mixtures. These foams are characterized by a good stability.

The discontinuous foaming procedure, however, makes it difficult to use in modern flow systems.

For a continuous procedure, a permanent delivery of medium to the beating machine must be assured, in order to operate at zero pressure and according to the "overflow" principle (Zehle, G. u.a. "Possibilities for plant rationalization-Experiences with the automated cake line", Bäcker u. Konditor 34 (1980) p. 201).

The continuous feeding of medium to the bowl and the horizontal and vertical turbulence during beating produces a partial mixture of foam and medium, before the whipping process has been finished, thus resulting in foams with small volume yield and stability.

The use of chemical whipping agents is unavoidable. Further continuously operating foaming units are pressure beaters ("Production methods of foamy sponges", Zucker- und Süss warenwirtschaft 30 (1977) 12, p. 448). In this case, foaming is produced by the introduction of gas, e.g. air, with compressors into the medium which also has been pressurized by pumps. Special mixing or dispersing devices with separate drive assure a fine dispersion of the air. Thus the production of foam according to the pressure beater procedure requires not only mechanical work for dispersing the gas within the medium, but also further work for producing the gas pressure. Considerable additional power consumption is required; for instance gas pressures of 0.19 to 0.98 $N/mm^2$ are necessary for the production of food foams. Application of this principle in the food industry implies that the pressure gas, e.g. air, is in a perfect sanitary condition, i.e. the air produced by compressors must be free from foreign admixtures, e.g. of oily nature. Therefore it is necessary to deoil and clean the air by filters being arranged following the compressor, thus further increasing the number of apparatus elements required for this procedure.

Further continuous units are characterized by the aerating gas being aspirated according to the principle of the water jet pump or the injector, i.e. by changing the speed of the medium to be foamed. Specially designed fluid flow installation then is required.

The prevailing disadvantage of this physical kind of gas introduction is the proportion between the medium to be foamed and the gas being only 60:40 at most. Food foams are predominantly produced from viscous mediums which have only poor suction qualities, i.e. the amount of gas or air drawn in is very limited in these continuous procedures, thus reducing the yield of foam (Clauss, J. u.a. "Production of curd cream mixtures with continuous cream foaming", Lebensmittelindustrie 27 (1980) p. 69; DE-OS 2312573).

The principle described here is used for the production of whipped cream, as an example. An air valve is built in the inlet pipe of a rotary pump or gear pump narrowed by a special nozzle. Air is introduced by aspiration in the flow of the medium to be foamed; then the mixture medium/air is foamed in a narrow-spaced homogenizer (DD-WP 64879; DE-OS 2202324).

The volume increase obtained with this procedure is 150 p.c. This continuous procedure is favorable as to the equipment; it is, however, only limited in use as to foam yield and foam stability, because the underpressures obtained with the flow process permit a maximum volume increase also for very liquid mediums only of 300 p.c., even in the face of using special stops and nozzles for elevating the speed difference of the medium.

The disadvantages of the known procedures for the production of food foams are caused on the one hand by the insufficient under-pressure conditions of procedures based on the injection principle, so that only a limited amount of air may be aspirated; on the other hand, in pressure beater machines the aerating gas must be pressurized in a separate installation and then incorporated into the medium to be foamed in special flow devices. That means high energy consumption and a number of units.

SUMMARY OF THE INVENTION

It is an object of this invention to provide an effective procedure for the production of food foams or foams which makes it possible to incorporate gas, for instance air of sanitary good condition, in the case of food industry, into a medium under few technical and energetic application, and to obtain, in combination with suitable dispersion units, high volumes and excellent foam qualities.

A further object of the invention is to produce well aerated edible foams of high volume, with a minimum of apparatus and energy input.

Another object is the combination of gas and medium to be foamed in such a manner that the continuous production of foams from flowable and pumpable mediums, especially of food foams, will be possible with few technical equipment and small gear power.

These and other objects and advantages of the present invention will become evident from the description which follows:

In summary, the present invention relates to a procedure for the production preferably of food foams from flowable and pumpable mediums, as e.g. egg/white solutions, whole egg/sugar mixtures, or cream products. It is applicable in the baking and confectionery industry, to the production of physically aerated baked and confectionery goods, as well as foamed confections. The main object of the invention is to produce well aerated foams of high volume with a minimum of apparatus and energy input. The invention therefore is based upon the aim of providing conditions and to introduce the gas in such a volume ratio into the medium to be foamed, that volumes of at least 900 p.c. are obtained. According to the invention, the medium to be foamed and gas are delivered separately to a pump, in a volume ratio of at least 1:8, mixed, and then the mixture (medium/gas) is delivered from the pump to a dispersion tube where it is foamed.

The present invention basically entails the provision of a procedure for the production of food foam or foam from flowable and pumpable mediums, as e.g. whole egg/sugar mixtures, egg white solutions, or cream products, and a gas, as e.g. air or nitrogen, wherein the medium to be foamed, and the gas, in a volume ratio of a least 1:8, are fed separately to pump, especially a screw or rotary pump, the medium and the gas being combined within the pump, in the range of the working elements, mixed, and the resulting mixture (medium/gas) being delivered by the pump, under a pressure of 0.19 to 0.98 N/mm$^2$, to a dispersion tube, where it is foamed. Typically, the air and the medium to be foamed are drawn in by separate conduits, and the volume stream is adjusted by the aid of throttle valves. Generally, the pump preferably delivers air, and the medium to be foamed at the same time serves as lubricant and sealing agent for the displacement pump.

According to this invention, the aerating gas, e.g. air, and the medium to be foamed, are drawn in by a pump; in particular a screw pump or rotary pump, in parallel in different quantity rations, premixed and delivered to following suitable dispersion unit. It is a significant feature of the invention that the above mentioned pumps aspirate gas in a high volume concentration; and parallel with this small quantities of the medium to be foamed which at the same time is used as lubricant and sealing medium, are delivered to the pump, preferably by gravity. A simple realization is the arrangement of the storage tank with the medium to be foamed above the pump, thus assuring that very liquid as well as viscous mediums may be fed under slight underpressures also in small quantities.

Another decisive feature of the invention is the aspiration of gas by the pump on a separate connection, the gas and said medium being combined only just near the working element of the pump.

Thus it will be possible to draw in by these pumps gas, e.g. air or nitrogen, and medium in a volume ratio of more than 10:1. The pressure arising at the outlet of the pump forces the air/medium mixture through an appropriate dispersion device for fine distribution of the gas within the medium, thus producing a stable foam. Using this principle, the additional energy input described for pressure beaters for generating the separate gas pressure of 0.10 to 0.98N/mm$^2$ may be avoided. The output will be adjusted by changing the rotational speed of the pump and by the manual or automatic valve regulation in the feeding of gas and medium.

The foams produced in this way present a good stability and quality and may be produced with high volume yield.

BRIEF DESCRIPTION OF THE DRAWING

The accompanying drawing is a schematic flowsheet of one embodiment of the invention.

DETAILED DESCRIPTION OF THE PREFERRED EMBODIMENT

Figure 1:
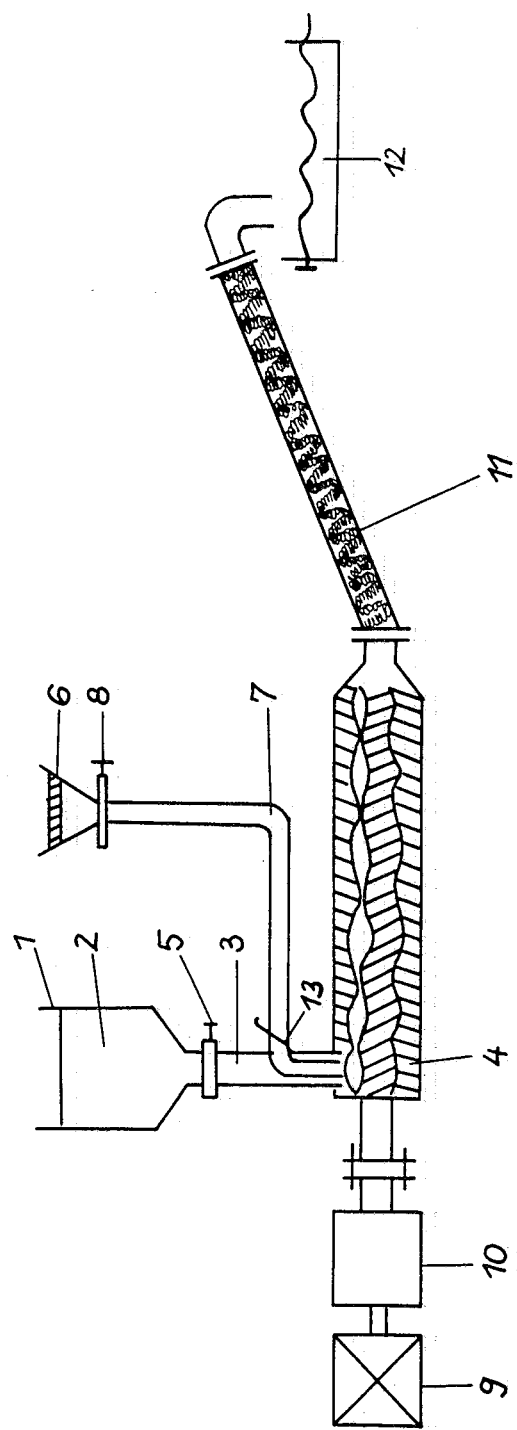

The invention will be further described by the following preferred embodiment. Referring now to the drawing, the following is a glossary of terms and elements employed in the present invention.

(1) tank
(2) whole egg/sugar mixture
(3) delivery conduit
(4) single screw pump
(5) valve
(6) filter
(7) conduit
(8) valve
(9) motor
(10) variable speed drive
(11) dispersion tube
(12) processing machine
(13) non-return valve In the drawing, the tank (1) is filled with a whole egg/sugar mixture (2). The delivery conduit (3) to the single screw pump (4) includes a nozzle (5) to set the desired feeding quantity by main or by means of a suitable control loop. The tank (1) is situated directly above the pump (4). By means of a filter (6) the ambient air is cleaned from dust and dirt particles, and delivered by a conduit (7) directly to the pump. For adjustment of the air quantity, another valve (8) corresponding to valve (5) is arranged in this conduit. The ratio between the cross-section of the air conduit and the whole egg conduit is 3:1. The pump (4) is driven by a motor (9) and a variable speed drive (10). The overdimensioning of the pump permits to fall rather below the rated speed, thus prolonging service life. Directly behind the pump (4) is a dispersion tube (11) which also may be designed as a feeding element to a processing machine (12).

It thus will be seen that there is provided a method for the production of edible food foams which attains the various objects of the invention, and is well adapted for the conditions of practical use. As numerous alternatives within the scope of the present invention will occur to those skilled in the art, besides those variations, alternatives and equivalents mentioned supra, it will be understood that the present invention is not to be limited in scope solely by the recitations in the appended claims, but extends fully to all equivalents thereof, both functional and structural.

What is claimed is:

1. A method for the production of an edible food foam which consists essentially of:
   (a) providing a fluid edible medium selected from the group consisting of a whole egg/sugar mixture, an egg white solution, and a cream product, said fluid edible medium being flowable and pumpable;
   (b) providing a dispersion and foaming gas selected from the group consisting of ambient air and nitrogen;
   (c) filtering said dispersion and foaming gas, so as to remove dust and dirt particles, and thereby to produce a cleaned dispersion and foaming gas of good sanitary condition, and usable for food industry;
   (d) separately inducting said fluid edible medium of step (a) and said cleaned dispersion and foaming gas of step (c) through separate parallel flow delivery conduits and to a mixing and pressurizing induction and displacement working element of a screw pump or a rotary pump, the ratio between the cross-section of the gas conduit and the medium conduit being about 3:1;

(e) separately feeding in discrete, physically separated streams said fluid edible medium and said gas to said pump element in a volume ratio of at least about 1:8, whereby said fluid edible medium and said gas are first combined and mixed by and in contact with the working elements of said pump element, so that an effluent mixture is produced in and discharged from said pump element;

(f) delivering the resultant effluent mixture discharged from said pump element, and under a pressure in the range of about 0.19 to 0.98N/mm² (newton per square millimeter), to a dispersion tube element, said dispersion tube element containing internal filling elements which permit fluid flow through said dispersion tube element while causing said mixture to foam, so as to form a product stable edible food foam in said dispersion tube element, said fluid edible medium and said gas being thereby foamed in a volume ratio such that a volume yield of at least 900% is obtained; and (g) removing and recovering said product edible food foam from the outlet end of said dispersion tube element.

2. The method of claim 1 in which the product edible food foam of step (g) is passed to a processing machine, the dispersion tube element being a feeding element to said processing machine.

3. The method of claim 1 in which the screw pump is a single screw pump.

4. The method of claim 1 in which the mixing and pressurizing induction and displacement pump element is driven by a variable speed drive, said variable speed drive being driven in turn by a motor.

5. The method of claim 1 in which the fluid edible medium and the gas are drawn in by the mixing and pressurizing induction and displacement pump element according to step (d) in a volume ratio of more than 1:10.

6. The method of claim 1 in which the fluid edible medium concomitantly functions as a lubricant and sealing agent for the mixing and pressurizing induction and displacement pump element in step (e).

* * * * *